(12) United States Patent
Mathon

(10) Patent No.: US 7,303,038 B2
(45) Date of Patent: Dec. 4, 2007

(54) HEAVY DUTY LOW RISE MOTORCYCLE

(76) Inventor: Albert W. Mathon, 18 Industrial Blvd., Medford, NY (US) 11763

( * ) Notice: Subject to any disclaimer, the term of this patent is extended or adjusted under 35 U.S.C. 154(b) by 221 days.

(21) Appl. No.: 11/145,831

(22) Filed: Jun. 6, 2005

(65) Prior Publication Data

US 2006/0037799 A1    Feb. 23, 2006

Related U.S. Application Data

(63) Continuation-in-part of application No. 10/923,510, filed on Aug. 19, 2004.

(51) Int. Cl.
*B62D 61/02*    (2006.01)
(52) U.S. Cl. .................. 180/219; 280/276; 280/279
(58) Field of Classification Search ............... 180/219, 180/222; 280/276, 277, 279
See application file for complete search history.

(56) References Cited

U.S. PATENT DOCUMENTS

| | | | |
|---|---|---|---|
| 906,417 A | 12/1908 | Harman | |
| 3,252,537 A | 5/1966 | Tarran | |
| 4,311,261 A | 1/1982 | Anderson et al. | |
| 4,461,489 A | 7/1984 | Tsukiji et al. | |
| 4,585,086 A | 4/1986 | Hiramatsu | |
| 4,951,774 A | 8/1990 | Buell | |
| 5,069,467 A * | 12/1991 | Claudio | 280/276 |
| 6,484,837 B1 | 11/2002 | Buell et al. | |
| D482,640 S | 11/2003 | TaMuRa et al. | |
| 2005/0051993 A1* | 3/2005 | Ito et al. | 280/276 |

* cited by examiner

*Primary Examiner*—Tony Winner
(74) *Attorney, Agent, or Firm*—Alfred M. Walker

(57) ABSTRACT

A heavy duty, low rise motorcycle includes a dual beam chassis having a pair of parallel, hollow fuel containing side members extending front to back along opposite sides of the motorcycle. The dual beam chassis also has front and rear hollow frame members joining front and rear portions of the side members, forming a low box section frame parallel to a road surface. A engine is mounted above and to the dual beam chassis between front and rear portions of the side frame members. An oil pan is attached below the engine block. The rear wheel receives driving power from the engine. The motorcycle is steered by a handle bar linkage controlling a front wheel mounted to the motorcycle. The steering linkage may be located inside a tubular front fender housing. Telescopic kickstand actuators may support the motorcycle when not in motion.

29 Claims, 10 Drawing Sheets

HEAVY DUTY LOW RISE MOTORCYCLE

RELATED APPLICATIONS

This application is a continuation-in-part of application Ser. No. 10/923,510, filed Aug. 19, 2004.

FIELD OF THE INVENTION

The present invention relates to heavy duty low rise motorcycles.

BACKGROUND OF THE INVENTION

U.S. Pat. No. 4,951,774 of Buell discloses a dual tank motorcycle fuel tank with a forked configuration, wherein the forked fuel tank is built into the motorcycle frame.

A motorcycle frame with an integral fuel tank is also disclosed in U.S. Pat. No. 6,484,837, also of Buell.

U.S. Pat. No. 3,252,537 of Tarran discloses a single motorcycle fuel tank in a tubular frame.

U.S. Pat. No. 906,417 of Harman also discloses a single motorcycle fuel tank in a tubular frame.

U.S. Pat. No. 4,461,489 of Tsukiji discloses a body frame with a single integral motorcycle fuel tank.

U.S. Pat. No. 4,585,086 of Hiramatsu and U.S. Pat. No. 4,311,261 of Anderson discuss motorcycle frames in general.

Additionally, rotatable steering systems are known in four wheeled motor vehicles, such as automobiles and trucks.

OBJECTS OF THE INVENTION

It is therefore an object of the present invention to provide a motorcycle frame/tank configured as two separate tanks.

It is also an object of the present invention to provide a motorcycle fuel gauge system which is accurate when riding on steep hills and descents on the road.

It is also an object of the present invention to provide a motorcycle front wheel subsystem which translate rotatable steering to horizontally oriented handlebar steering.

It is also an object to provide a tubular fender for a motorcycle steering mechanism.

SUMMARY OF THE INVENTION

In keeping with these objects and others which may become apparent, the heavy duty, low rise motorcycle of the present invention includes a dual beam chassis having a pair of parallel, hollow side members extending front to back along opposite sides of the motorcycle. The dual beam chassis also has front and rear hollow frame members joining front and rear portions of the side members forming a low box section frame parallel to a road surface, wherein the side, front and rear hollow frame members each contain fuel. A engine is mounted above and to the dual beam chassis between front and rear portions of the side frame members. An oil pan is attached below the engine block. The rear wheel receives driving power from the engine. A front wheel is mounted to the motorcycle to steer the motorcycle, and is connected via a steering linkage inside a tubular front fender housing. The motorcycle is steered by a user operable handle bar located to a rear of the engine, and the steering linkage connected to the handle bar extends along opposite sides of the engine for connection to the front wheel.

In one embodiment, a front and one side hollow member form one tank for fuel and a rear and another side hollow member form a second tank for fuel. In this embodiment, the first and second tanks may have separate fillers and separate fuel feeds to the engine.

External hose connections may be optionally provided between the first and second tanks for equalizing fuel content, to maintain left-side/right-side balance while driving the motorcycle.

In an alternate embodiment, the first and second tanks can be replaced by a dual beam single fuel tank.

Preferably, the front wheel of the motorcycle is smaller than the rear wheel.

The motorcycle includes a unique front fender tube for securing the front wheel. This front tube is partitioned into an upper section rigidly attached to the box frame chassis and a lower section joined to the front wheel, which lower section is rotatable with the front wheel when the motorcycle is steered.

Inside the front fender tube is located the steering shaft, which is joined at a lower end to rotate the rotatable lower section of the front fender tube and the front wheel. This steering shaft extends through the non-rotatable upper section of the front fender tube and is joined at an upper end of the steering shaft to the steering linkage to transmit a turning force from the user operable handle bar to the lower front tube section and front wheel. A unique linkage transform the rotatable movement of the steering shaft to side to side horizontally oriented motion of the motorcycle handle bar, so that the motorcycle can be steered in the usual manner by a motorcycle driver, without having to resort to a rotatable steering wheel.

The motorcycle has multiple pressure sensors in the low box section frame members to measure remaining fuel. Each pressure sensor allows for a computer controlled electronic fuel level gauge.

The motorcycle also has a tilt sensor for sensing road grade, which acts in combination with an accelerometer to detect the level of acceleration or deceleration of the motorcycle. Preferably a computer samples all the sensors at about two second intervals to provide and display a moving average of fuel remaining.

The hollow frame fuel tank members are preferably filled with an open cell foam to minimize sloshing of fuel within the hollow frame members.

A single fuel pump with multiple fuel intakes is provided in the hollow frame fuel tank members, wherein each fuel intake is preferably fitted with a float valve at its outer distal end, to seal the fuel intake when no fuel is present at that location and to allow fuel to flow through the fuel intake, to the fuel pump, when the float valve is submerged in fuel.

When parked, because of the weight of the heavy duty low rise motorcycle, a standard kickstand can be replaced by telescopic electric actuators to support the motorcycle upright when it is not in motion.

The motorcycle of this invention is very large and powerful. The preferred embodiment uses a V-16 engine rated at 1000 horsepower; it was designed for automobile and marine application where it has been used successfully.

The prototype has a welded steel frame, but later versions can have a welded aluminum or a bonded carbon fiber frame. Also, a smaller embodiment with a two cycle V-twin motorcycle engine retaining the other features of the preferred embodiment is an alternate embodiment.

While quite heavy, the motorcycle of this invention maintains a low center of gravity by using a low box section frame parallel to the road surface made up of rectangular tubes with a crossection of 3" wide by 8" high.

To further enhance the low center of gravity and to afford more design freedom, the hollow frame members do double duty by also serving as the fuel tank.

Although physically large, the motorcycle typically uses a smaller wheel at the front and a larger wider wheel at the back; it is a true two-wheeler.

Also, familiar cruising style motorcycle handlebars which rotate horizontally on a vertical pivot are used by the driver for steering. Instead of a fork with dual support members, the front wheel is attached to a large diameter (8") single tube; this affords more rigidity and offers enhanced aesthetics.

In lieu of a kick stand or the driver using his or her legs to steady this motorcycle while stationary, a pair of electric actuators are mounted at the extreme left and right edge of the back crossmember of the frame. When deployed, they act as two screw jacks touching the ground to prevent toppling over.

The dual beam frame/tank can be configured in any of three distinct fluid designs, but in any case it is the framework connecting the front wheel subassembly to the engine and to the rear wheel.

The first configuration is as two separate tanks, left side and right side. Crossmembers are also fuel filled, but do not communicate fluidically between both tanks. However, in the preferred embodiment, routing of the engine exhaust precludes using the rearmost sections of both sides of the dual beam frame tank as fuel-filled tank members. The heat from the exhaust also eliminates the rear crossmember as a fuel-filled tank section. They have separate fillers, but the fuel pump draws from both tanks simultaneously.

A second configuration is physically identical to the first, but the two tanks are connected together via external hoses. A single filler is used.

In the third configuration, both sides are merged into a common tank by virtue of flow from one side to the other via the crossmembers.

Regardless of the particular configuration, the side frame members are quite long and not very deep. This poses a problem because of the lack of a convenient natural low point that would serve as a fuel pump intake point in a conventional tank. To minimize sloshing of fuel during hard acceleration or deceleration, a polymer open cell foam fills the entire inner space of the frame/tank. However, fuel will still migrate to the front or back during these periods. Also, when going up a hill, even at a steady speed, (or stopped on a hill) the fuel will migrate to the back; the reverse is true when pointed downhill. Rounding a curve at speed will unbalance the fuel left and right in configurations that are connected. These situations, coupled with a tank low on fuel, dictates that at least two (and preferably four) fuel intake points be used to prevent fuel starvation. They would be at the extreme front and back and on the left side and right side frame member. At any moment, from one to four fuel intake points will be submerged. Float valves at each fuel intake will shut off any point that is not currently submerged in fuel. In this way, the four fuel intakes are plumbed together via rigid or flexible tubing to the common input of the fuel pump. The pump will draw fuel from any float valve that is open (i.e.—submerged). Although the preferred embodiment uses a single fuel pump as described, multiple fuel pumps, each with one or more float valve equipped fuel intakes, may be used as an alternative.

A similar problem exists relative to accurate fuel level reporting. Using a single float or pressure sensor in the middle of one side frame member will provide approximate sensing of fuel level only on a level road while stationary or moving at constant speed. The same effects that would cause fuel starvation with a single fuel intake point will make such a level sensor system useless under those conditions described above.

Therefore, a computer controlled electronic fuel level gauge using multiple sensors solves this problem. Pressure sensors are co-located with each fuel intake/float valve inside the frame/tank. Additionally, a tilt sensor that senses road grade is used along with an accelerometer that detects level of acceleration or deceleration. All of these sensors are input to a microcomputer that samples at two second intervals. These parameter readings are then used to create an instantaneous estimate of the fuel in the left and right sides of the frame; the two values are added and then a moving average of the last five estimates is computed and presented in digital form on a display to the driver. The estimate software is a combination of table look-up and algorithms which are both empirically and analytically derived.

The front tube which secures the front wheel is partitioned into two sections. An upper section is rigidly attached to the frame as by welding. The lower section which carries the front wheel is rotatable by the steering mechanism. A steering shaft is rotated by a meshed pair of angular miter gears. One gear is rigidly attached to the steering shaft and angled in line with it, while the mating angular miter gear runs on a vertical shaft and is rotated by the front member of a four-bar linkage wherein the rear member is rigidly attached to the handle bars and is pivoted on a vertical shaft at the rear.

In an alternate embodiment of the steering linkage, angular miter gears are replaced by a linkage incorporating universal joints. The linkage transmits steering motion from the front crossbar, which is horizontal, to the lower internal steering shaft, which is angled at the same angle of the fixed steering tube with which it is co-axially aligned. The lower steering shaft is identical to the steering shaft attached to miter gears of the previous embodiment, except for a fluted end engagable with one of the universal joints.

The lower universal joint attached to the steering shaft has an integral vibration damper and mating fluted sockets to receive fluted shaft ends from both of its sides. The fluted shafts permit small axial motions to prevent binding while transmitting rotary motion without backlash. The vibration damper filters out road vibration from the steering linkage while still affording adequate road feel.

A centrally located double fluted jackshaft between the two universal joints is supported by a hollow shaft support hanger collar, which is rigidly attached to the motorcycle frame. The central jackshaft couples the lower universal joint to the upper double-jointed universal joint. It is free to rotate within the hollow bearing in the hanger collar. The upper universal joint couples with an upper fluted shaft, which is rigidly attached to the steering crossbar, such as by welding.

Long side links couple the handle bar motion to the front member which turns the drive miter gear or the universal joints. The side links must transverse the entire length of the engine since this separates the front drive gear from the handle bars near the driver at the rear. The result is a direct steering motion ergonomically similar to that of a regular, smaller motorcycle.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE PREFERRED EMBODIMENT

Figure 1:
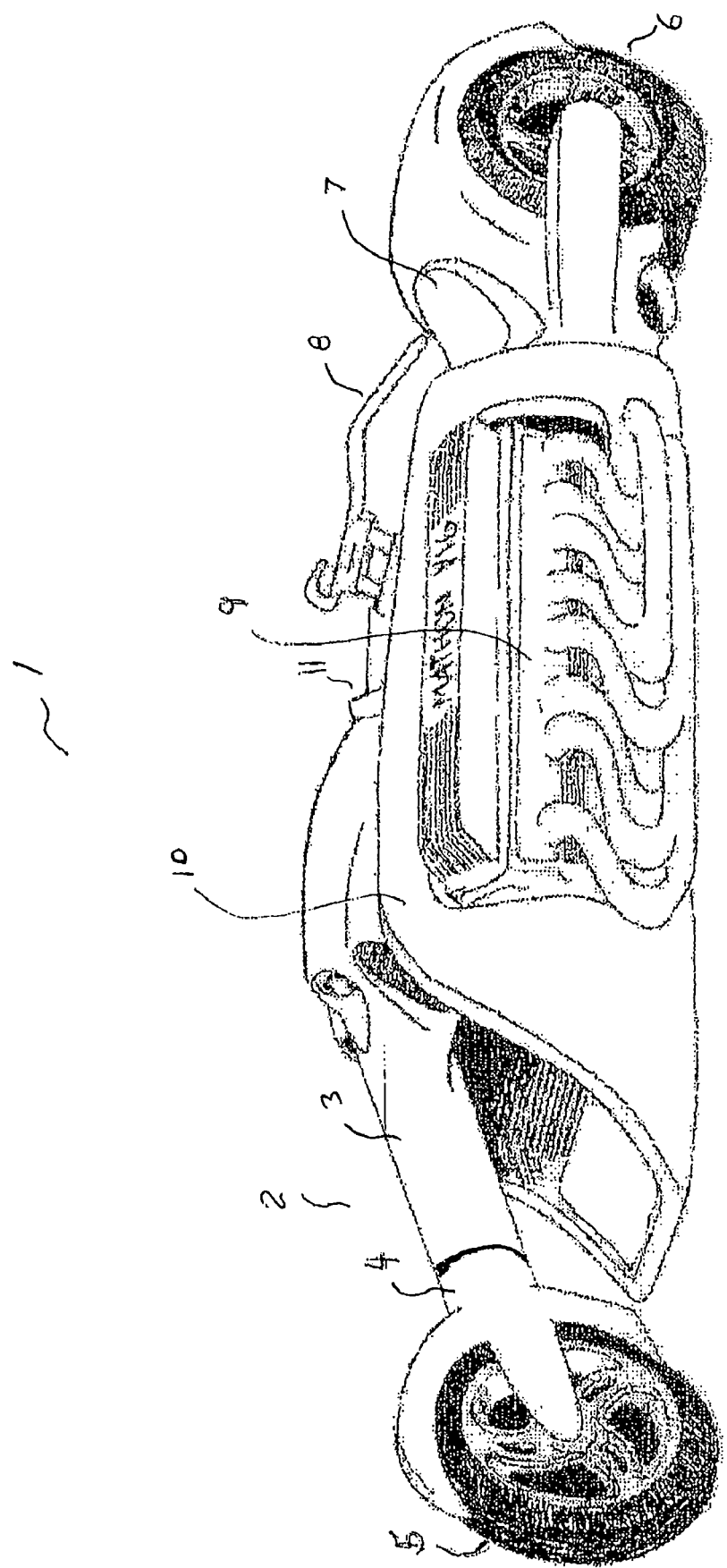
FIG. 1 is a perspective view of the motorcycle of this invention.

FIG. 1 shows the motorcycle 1 of this invention with V-16 engine 9, body shroud 10, and digital instrument cowl 11. Front wheel subassembly 2 includes rigid tube 3, rotatable tube 4, and front wheel 5 with fender. There is a significant distance between tube 3 and handle bars 8 which are in the vicinity of driver seat 7 ahead of wide rear wheel 6.

Figure 2:
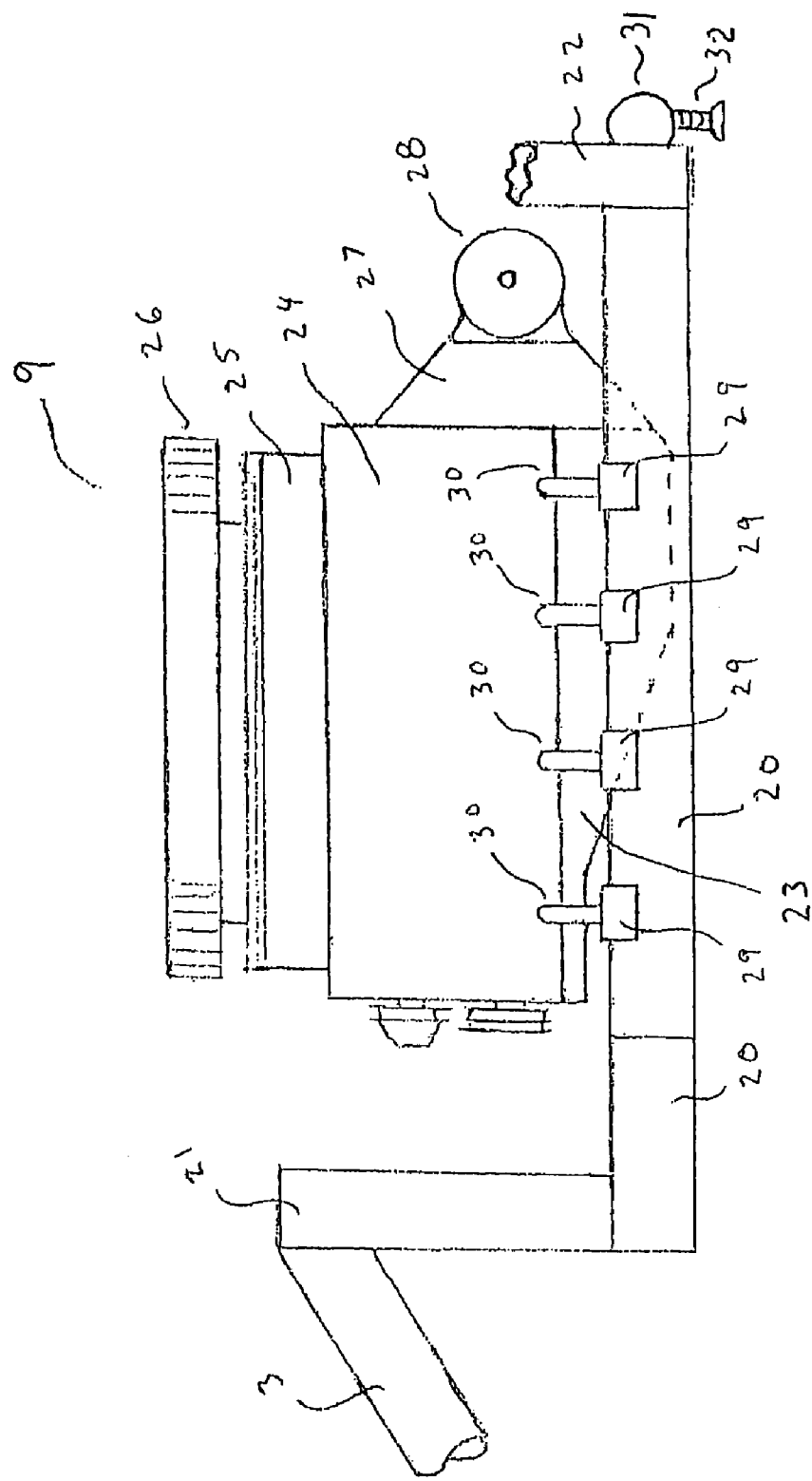
FIG. 2 is a side elevation detail showing the attachment of the engine to the left side frame.

FIG. 2 shows a side view detail with body shroud 10 removed. Frame/tank 20 is shown at bottom surrounding the oil pan 23 attached to engine 9. Front frame upright 21 is welded to both frame/tank 20 as well as rigid tube 3 which is part of the steering/front wheel subassembly. A small portion of back frame upright 22 is shown with one of two electric actuators 31 with anti-topple member, such as screw 32. While two kickstand actuators 31 are shown, it is anticipated that one or more electric actuators 31 may be employed to support the motorcycle while parked. Additionally, other motive forces may be employed such as pneumatic or hydraulic motors to actuate actuators 31.

Engine 9 has air cleaner 26, valve covers 25 and engine block 24. Rigid supports 30 are shown attaching engine block 24 to welded stress spreading pads 29 on frame/tank 20. A two-speed automatic transmission with reverse 27 is attached to engine 9 with right angle power output 28.

Figure 3:
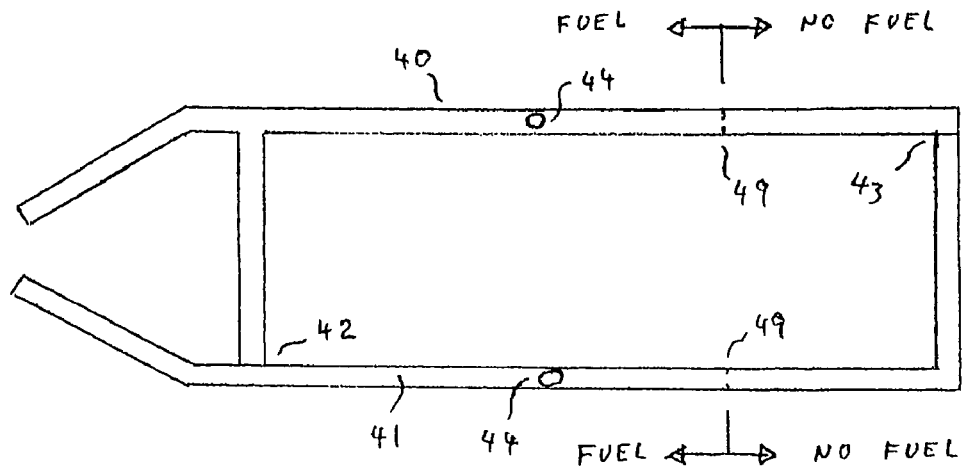
FIG. 3 is a top schematic view of the frame/tank configured as two separate tanks (left and right).
Figure 4:
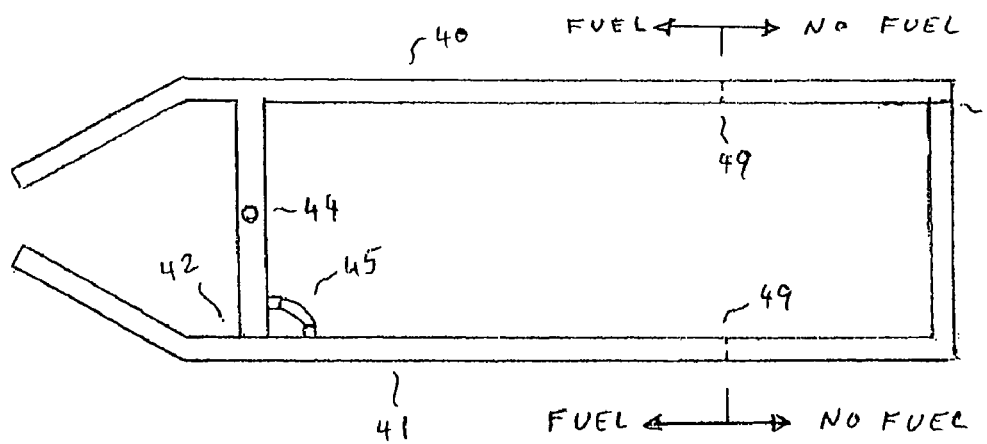
FIG. 4 is a top schematic view of the frame/tank configured as two separate tanks with external hose connections between the two sections.
Figure 5:
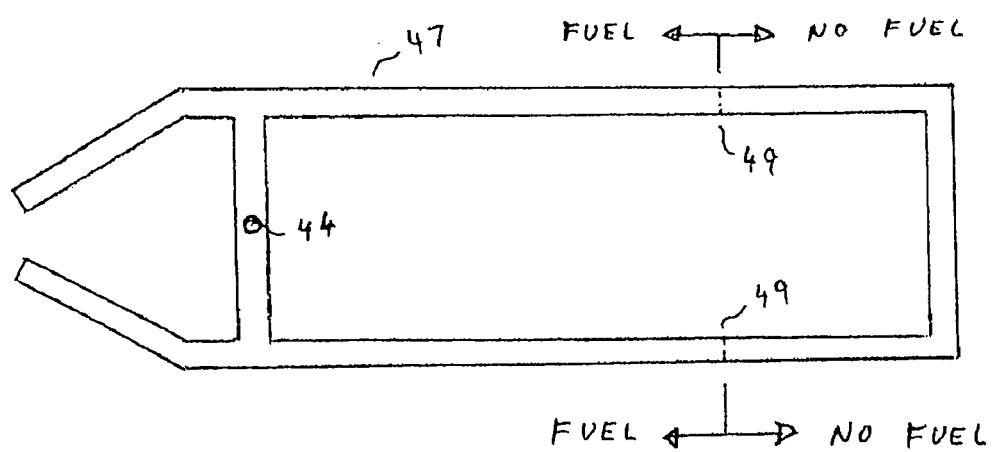
FIG. 5 is a top schematic view of the frame/tank configured as a single tank with crossmembers communicating fuel from left and right sides.
Figure 3A:
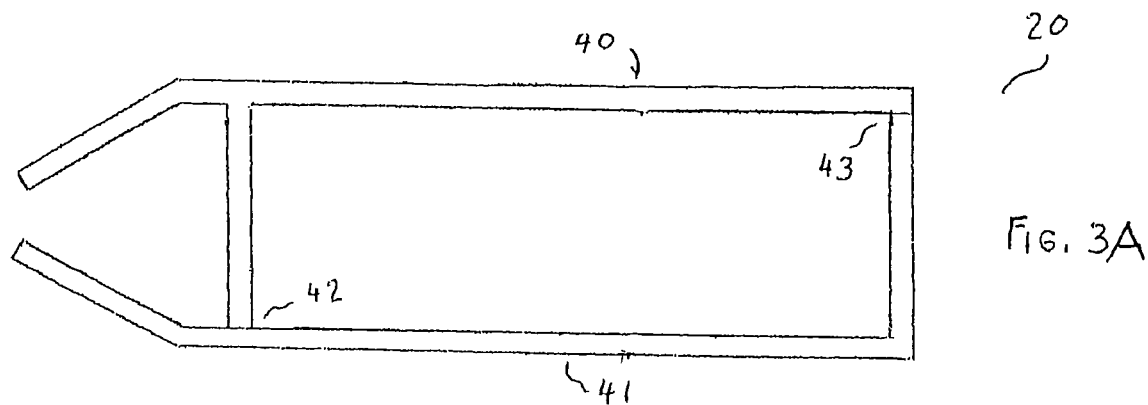
FIG. 3A is a top schematic view of an alternate embodiment for the frame/tank configured as two separate tanks (left and right).
Figure 4A:
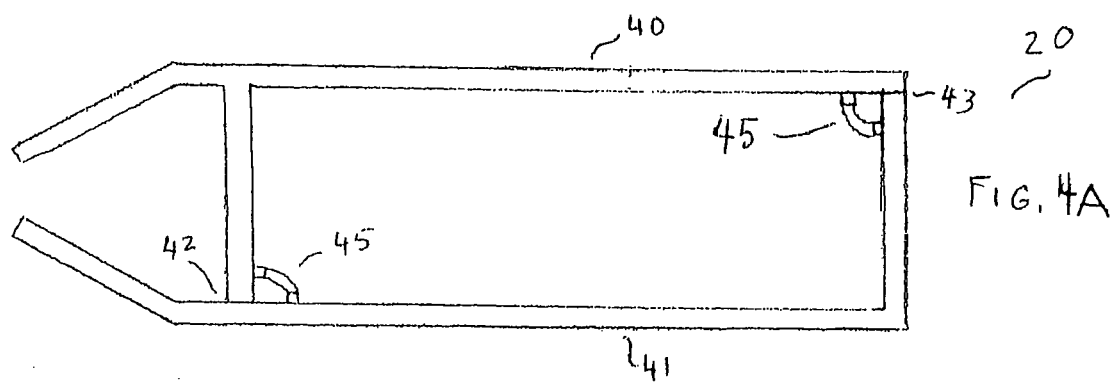
FIG. 4A is a top schematic view of an alternate embodiment for the frame/tank configured as two separate tanks with external hose connections between the two sections.
Figure 5A:
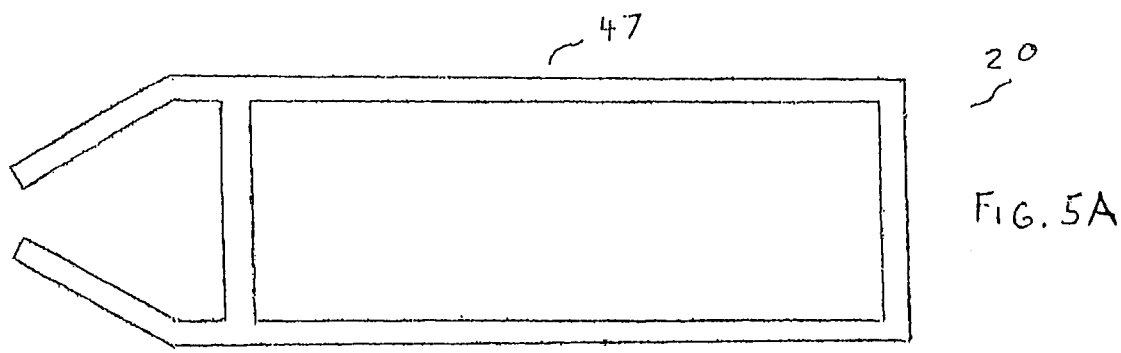
FIG. 5A is a top schematic view of an alternate embodiment for the frame/tank configured as a single tank with crossmembers communicating fuel from left and right sides.

FIGS. 3-5 show three variations of fluidic communication between various sections of frame/tank 20. FIGS. 3A, 4A and 5A show further alternate embodiments of fluidic communication between various sections of frame/tank 20.

In FIGS. 3 and 3A two separate tanks are shown which are welded into a common frame. Tank 40 includes the right side and front crossmember, while tank 41 is the left side and rear crossmember. Although welded at junctions 42 and 43, there is no fluid communications at these junctions. Separate fillers 44 are used with each tank, but a fuel pump will draw fuel from both tanks simultaneously.

In FIGS. 4 and 4A, fluid communications is introduced via one or more short hose member 45 so that fuel can equalize between separate tank sections to prevent any left-side/right-side unbalance.

In FIGS. 5 and 5A, frame/tank 20 is a single tank with fuel filled crossmembers communicating between right and left side members. A single filler 44 is used in the configurations of FIG. 4 or 5; they may be placed as shown on the front crossmember.

In the preferred embodiments, exhaust routing and components dictate that the rear portions of frame/tank 20 in any of the configurations shown in FIGS. 3-5 not be fuel-filled due to heat and safety concerns. Internal baffles shown as dashed lines 49 prevent fuel from entering this rear section. If exhaust heat is not an issue due to a different exhaust configuration, then the frame tank embodiments shown in FIGS. 3A, 4A and 5A may be utilized without internal baffles 49.

Figure 6:
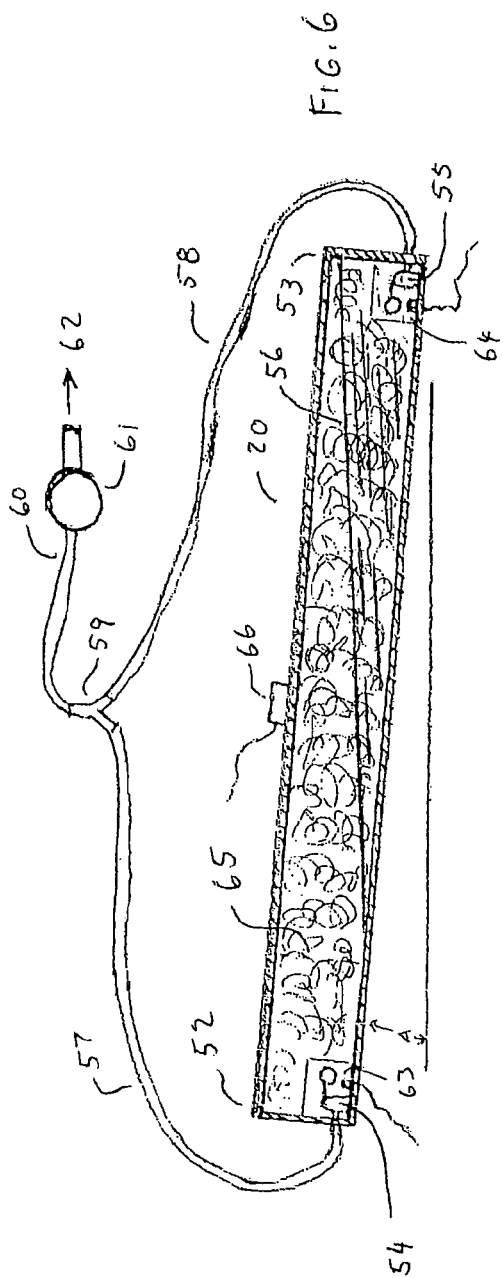
FIG. 6 is a side view crossection of the left side frame/tank revealing the components and conditions within while climbing a road with grade angle "A".

FIG. 6 shows the inside of the left side rail of frame/tank 20 which is almost entirely filled with polymer open cell foam 65 to minimize sloshing from front to back and vice-versa. The tank section is partially filled with fuel 56 and front end 52 is tipped up relative to back end 53 due to road grade angle "A". At each end is a small compartment void of foam 65. The front area contains float valve 54 and pressure sensor 63. Since there is no fuel in this region, float valve 54 is turned off since the float is not "floating". This means that hose 57 is not venting air nor supplying fuel to the intake at Y 59 or inlet 60 of fuel pump 61. Yet Fuel pump 61 is providing fuel at outlet 62 via float valve 64 (submerged in fuel and open), hose 58, Y 59 and inlet 60. Actually, two more float valves from the right side rail of fuel/tank 20 can also supply fuel to pump 61. These connections which would also merge into inlet 60 are not shown for clarity.

Figure 7:
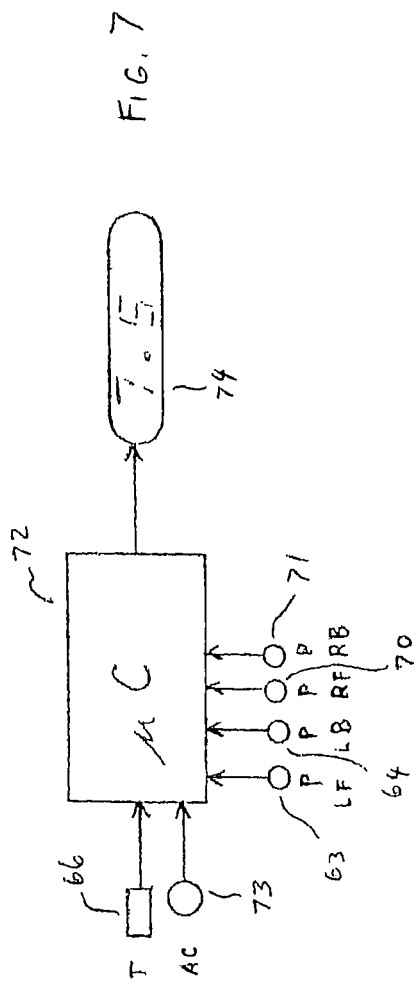
FIG. 7 is a block diagram of the fuel gauge system.

FIG. 7 shows a block diagram of the fuel gauge system. Tilt sensor 66, accelerometer 73 and four pressure sensors (63, 64, 70 and 71) input to microprocessor 72. As described in the summary, this processor creates an estimate of the total fuel contents of frame/tank 20, updates it at two second intervals and displays the value in gallons or liters on digital display 74.

Figure 8:
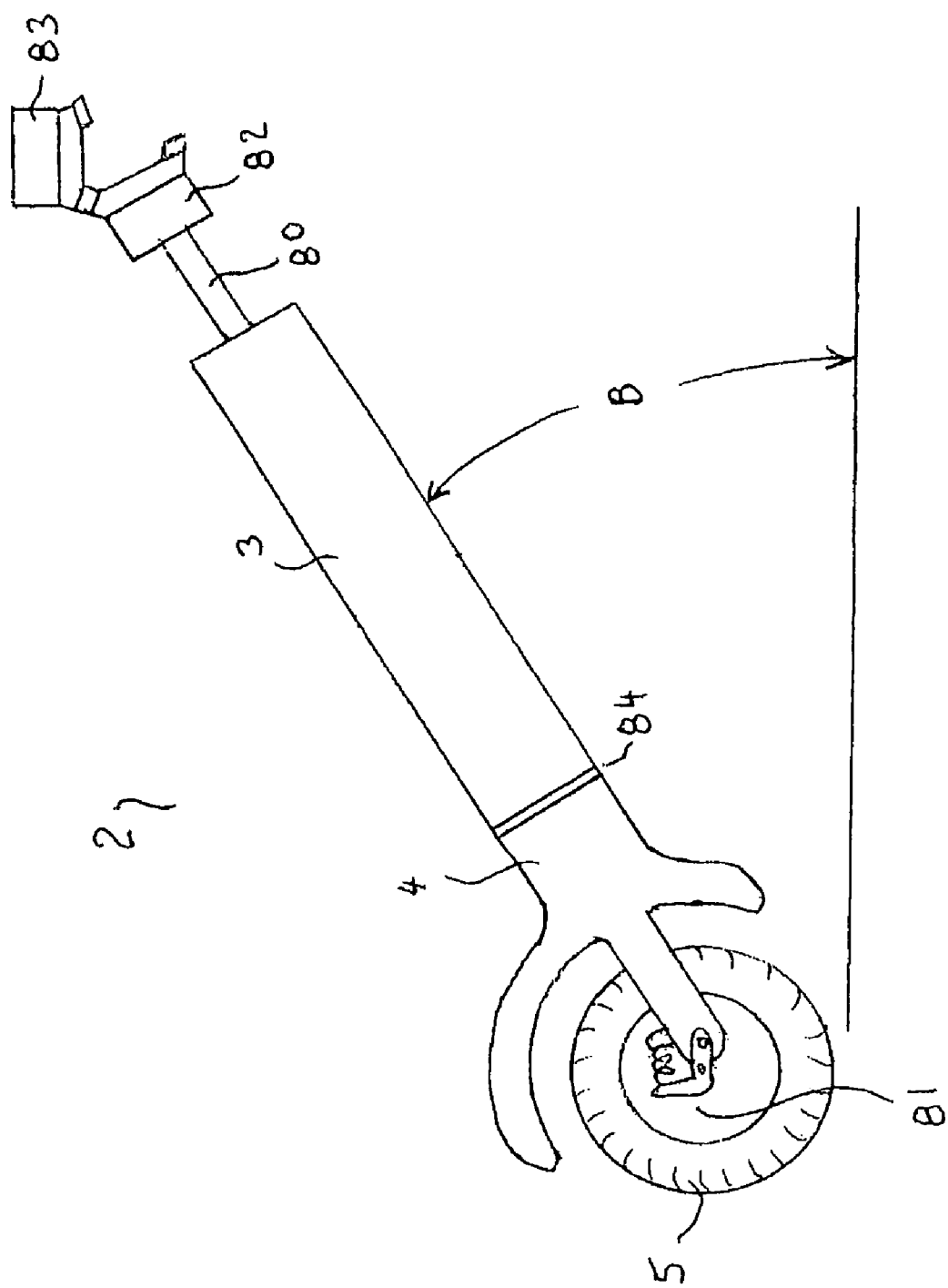
FIG. 8 is a side elevation of the front wheel subsystem.

FIG. 8 shows a side detail of front wheel assembly 2. An extension of rotatable lower tube section 4 is formed into side members on either side of wheel 5 and attaches lever-style spring suspension 81 which, in turn, attaches to wheel 5. This provides a minimal amount of wheel travel. Steering shaft 80 extends through fixed tube 3 and couples to rotatable tube 4 to provide steering. A polymeric seal 84 (such as Teflon™) is used between the front tube sections to keep the region free from debris while permitting free rotation. Shaft 80 is driven by angular miter gear 82 engaged with identical gear 83 which is driven by the steering linkage (see FIG. 10). Angular miter gears 82 and 83 must be selected with the proper shaft angles to result in the desired front tube to ground angle "B". For example, gears with shaft angle of 120 degrees will provide a B angle of 30 degrees to level ground.

Figure 9:
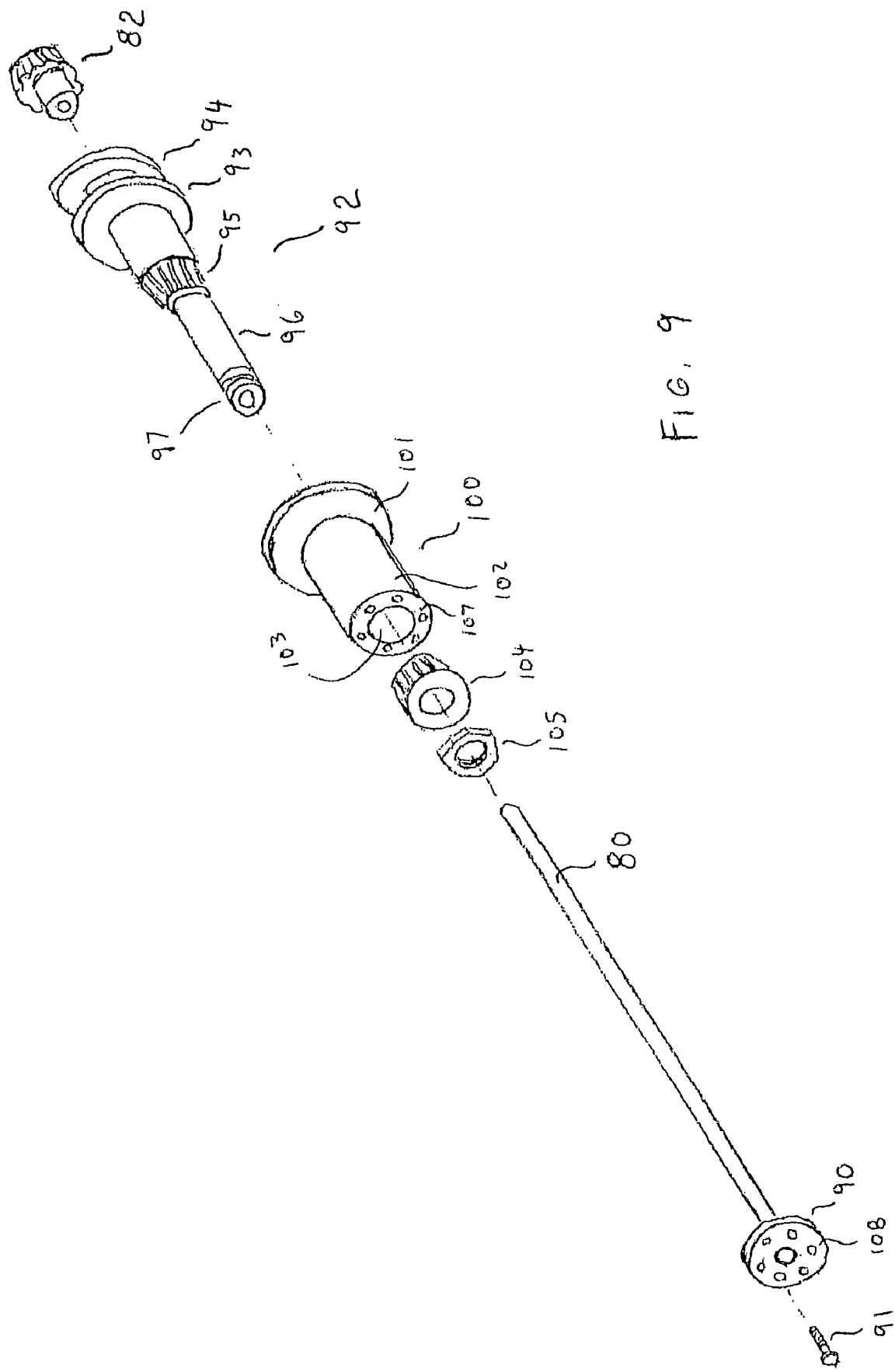
FIG. 9 is a perspective exploded view of the steering components within the stationary and rotatable sections of the front tube.

FIG. 9 shows an exploded view of the parts within tubes 3 and 4. Subassembly 92 includes rear section with flanges 93 and 94, tapered roller bearing 95, hollow shaft 96 with front threads 97. This subassembly 92 is welded inside fixed tube 3 at the periphery of flanges 93 and 94. Hub assembly 100 consisting of hub 102 with flange 101 is welded inside near the top end of rotatable tube 4 at the periphery of flange 101. Hub 102 has a central orifice which is tapered outward so as to provide a race compatible with bearing 95 at its top end and with bearing 104 at its bottom end. For assembly, after subassemblies 100 and 92 are welded inside their respective tubes, shaft 96 is inserted through hub 102 and bearing 104 is then pushed onto the threaded end 97 of tube 96. Special jam nut 105 is then carefully threaded onto threads 97 thereby adjusting proper bearing preloads and at the same time attaching tube 3 to tube 4. Then steering shaft 80 is inserted through the hole inside shaft 96 and the hole pattern 108 on flange 90 is fitted in registration with threaded hole pattern 107 on hub 102. Screws 91 (only one shown for clarity) are then used to fasten steering shaft 80 to hub 102. After attachment, shaft 80 will extend beyond the top end of tube 3. Angular miter gear 82 is then attached to the distal end of steering shaft 80.

Figure 10:
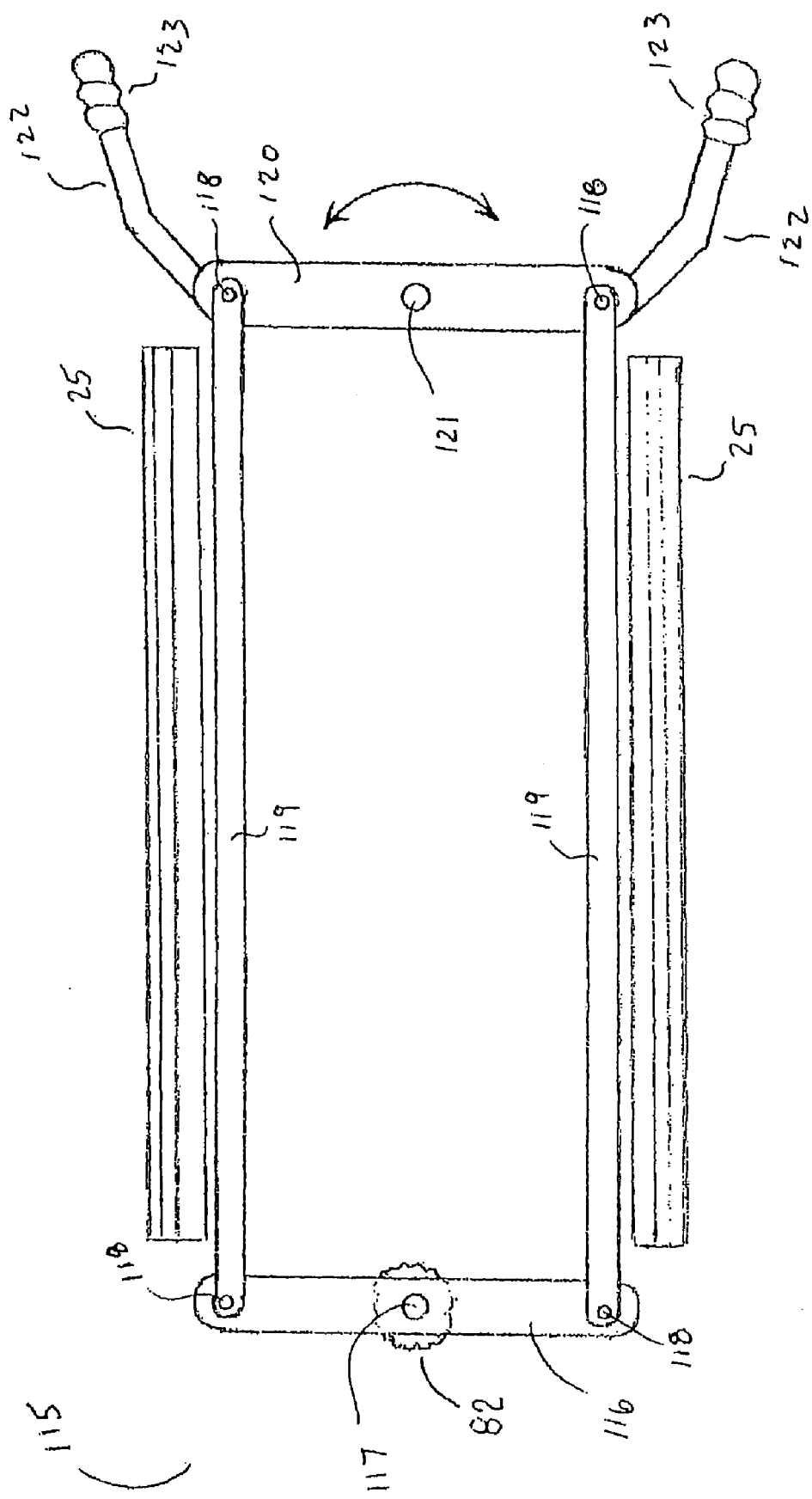
FIG. 10 is a top view of the steering linkage from the steering drive gear at the front to the handle bars at the rear.

FIG. 10 is a top view of the four-bar linkage that communicates the handle bar 122 motion to drive miter gear 82 at the front which engages with the steering shaft 80. Valve covers 25 are shown in this figure to show where long links 119 are placed and to emphasize that links 119 must traverse the entire length of engine 9. Front crossbar 116 pivots on vertical pivot 117 and is rigidly attached to angular miter gear 82. Rear crossbar 120 is rigidly attached to handle bars 122 with grips 123; it pivots on vertical pivot 121. Pivots 118 transmit motion from link bars 119 to crossbars 116 and 120. Using this linkage, a simple turn in a horizontal plane on the handlebars is translated into an angular turning of tube 4 and hence front wheel 5.

Figure 11:
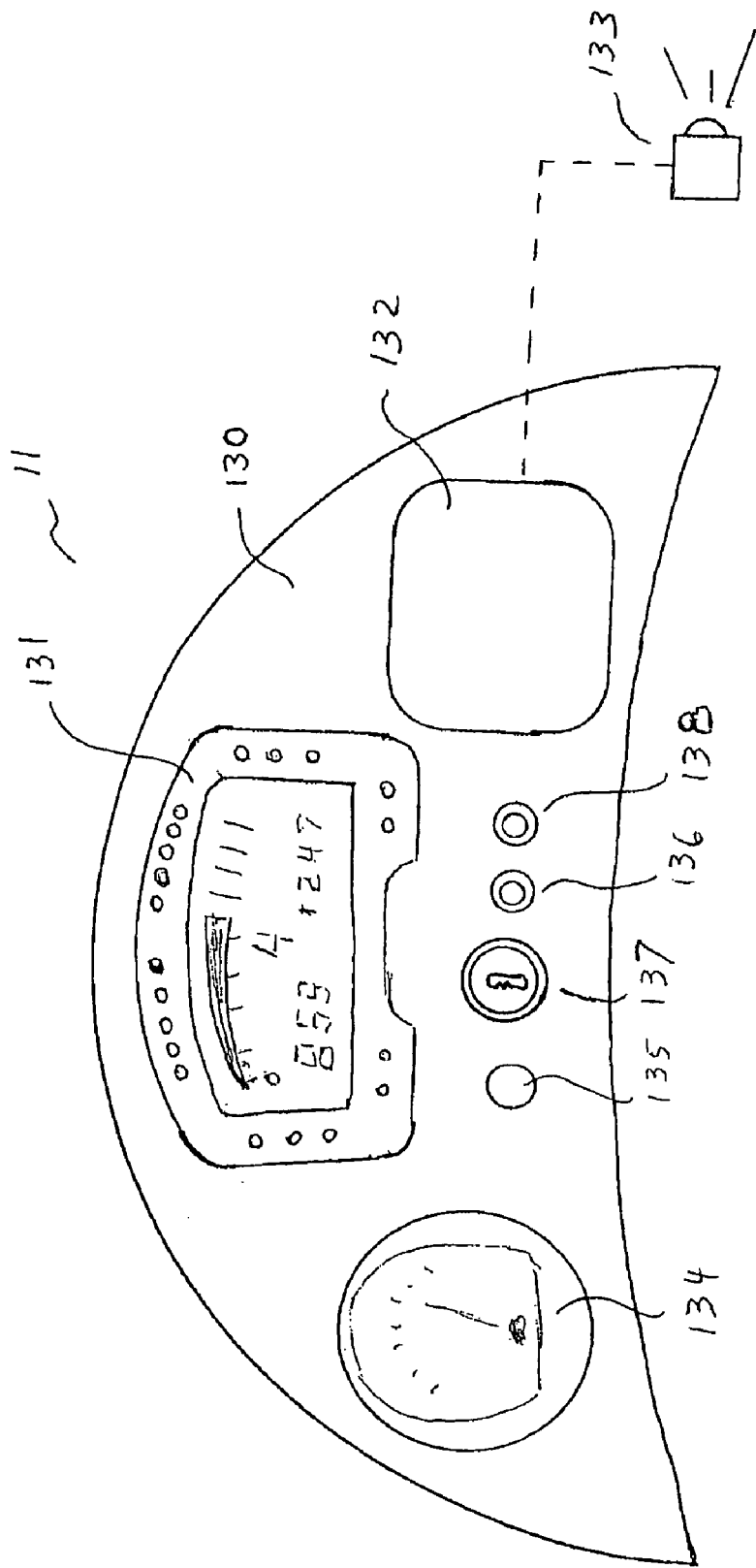
FIG. 11 is a front view of a typical ergonomically located digital and/or analog instrument panel of the motorcycle.

FIG. 11 shows a typical configuration of digital display panel 11. Structural panel 130 has several optional items mounted. Multi-functional electronic display 131 will show speed, water, oil, RPM's, dual water/temperature, oil temperature, fuel pressure and transmission temperature. In addition, it can be configured to also display fuel gauge information from an electronic sending unit. Commercially available versions of display 131 are known as MXL or MXL PRO. An optional analog gauge 134 can be used for a variety of purposes where motion of an analog needle is still superior to a digital display; this can be a tach, oil pressure gauge, etc. Indicator 135 is a hazard warning indicator. Key lock 137 is centrally located. Audio jack 136 is for head phones while electronic jack 138 is for hookup to an electronic system analyzer. Video display 132 is a substitute for rear and side-view mirrors. It is used to display wide angle rear view from rear mounted camera 133. It is further noted that these displays are ergonomically located just below the driver's line of sight, so that substantially continuous eye contact with the road occurs while driving and riding the heavy duty, low rise motorcycle 1 on the open road.

Figure 12:
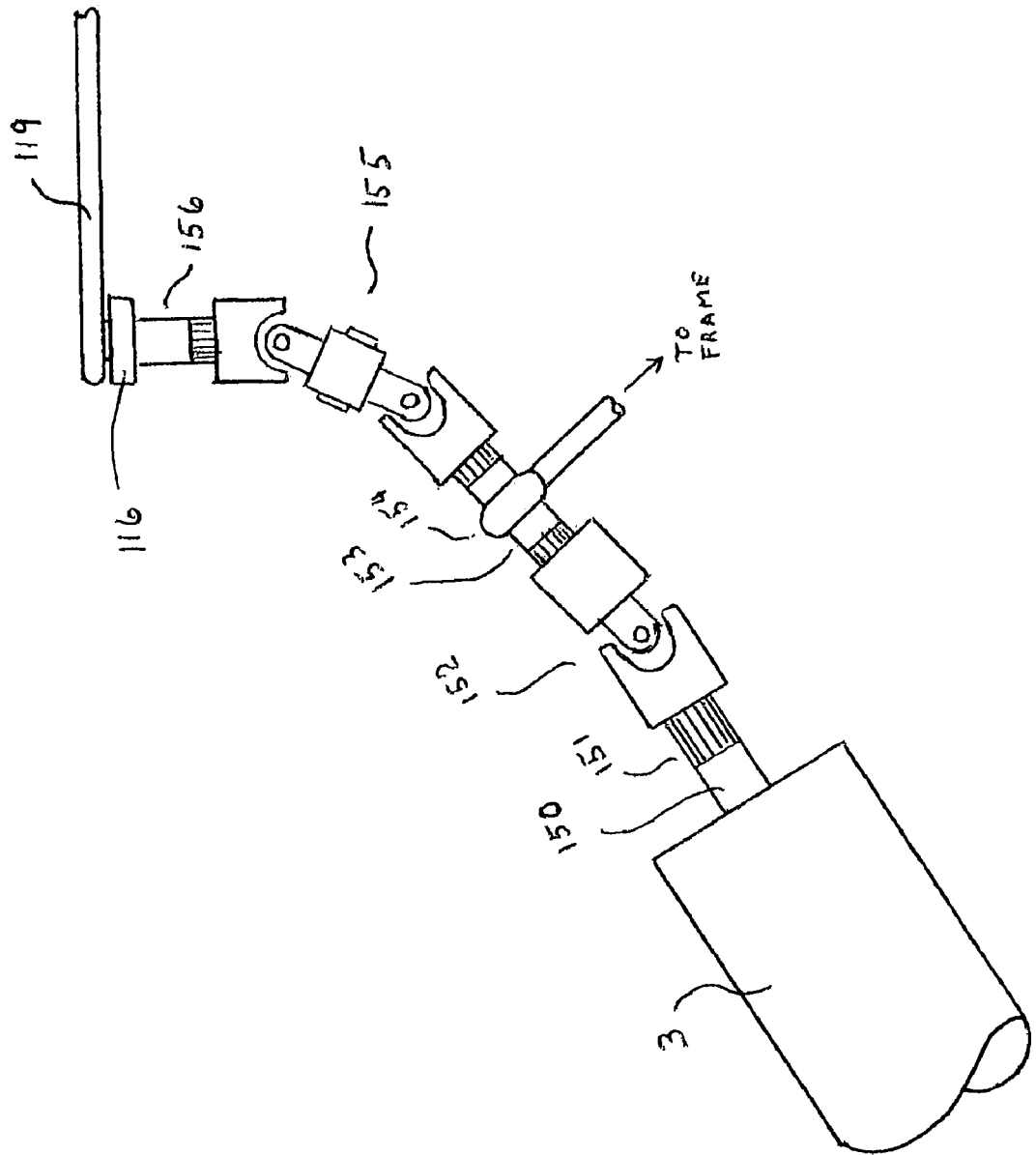
FIG. 12 is a side elevation of an alternate embodiment showing a linkage incorporating universal joints for coupling steering motion from a front crossbar to the steering shaft.

In an alternate embodiment of the steering linkage, angular miter gears 82 and 83 are replaced by a linkage incorporating two universal joints. This is illustrated in FIG. 12. The linkage transmits steering motion from front crossbar 116, which is horizontal, to steering shaft 150 which is angled at the same angle of fixed steering tube 3 with which it is co-axial. Steering shaft 150 is identical to steering shaft 80 of the previous embodiment except for fluted end 151.

Universal joint 152 has an integral vibration damper (not shown) and mating fluted sockets to receive fluted shaft ends from both sides. The fluted shafts permit small axial motions to prevent binding while transmitting rotary motion without backlash. The vibration damper filters out road vibration from the steering linkage while still affording adequate road feel.

Double fluted jackshaft 153 is supported by shaft support hanger 154 which is rigidly attached to the motorcycle frame. Jackshaft 153 couples lower universal joint 152 to upper double-jointed universal 155; it is free to rotate within the bearing in hanger 154. Universal joint 155 couples with fluted shaft 156 which is rigidly attached (as by welding) to steering crossbar 116.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A motorcycle comprising:
    a dual beam chassis having a pair of parallel, hollow side members extending front to back along opposite sides of said motorcycle;
    said dual beam chassis also having front and rear hollow frame members joining front and rear portions of said side frame members forming a low box section frame parallel to a road surface, said side, front and rear hollow frame members each containing fuel;
    an engine mounted above and on said dual beam chassis between front and rear portions of said side members;
    a rear wheel for receiving drive from said engine;
    a front wheel mounted for steering of said motorcycle; and
    a handle bar for steering said motorcycle located to a rear of said engine, and a steering linkage from said handle bar extending along opposite sides of said engine for connection to said front wheel;
    a front tube for securing said front wheel, said front tube being partitioned into an upper section rigidly attached to said box frame and a lower section joined to said wheel and rotatable with said front wheel when steered; and
    a linkage within said front tube transmitting steering motion turning force from said handle bar to said front wheel.

2. The motorcycle of claim 1 in which a first side hollow member forms one tank for fuel and a second side hollow member forms a second tank for fuel, said first tank and said second tank separated from each other.

3. The motorcycle of claim 2 in which said first and second tanks have separate fillers and separate fuel feeds to said engine.

4. The motorcycle of claim 3 having external hose connections between said one first tank and said second tanks for equalizing fuel content to maintain left-side/right-side balance.

5. The motorcycle of claim 4 having a steering shaft joined at a lower end to rotate said lower section of said front tube and said front wheel, said steering shaft extending through said upper section of said front tube and joined at an upper end of said steering shaft to said steering linkage for transmitting said steering motion turning force from said handle bar to said lower front tube section and front wheel.

6. The motorcycle of claim 5 wherein said steering linkage is an angular miter gear engagable with a further miter gear engagable with said steering linkage.

7. The motorcycle of claim 5 wherein said steering linkage is a universal joint linkage.

8. The motorcycle as in claim 5 further comprising a linkage transforming said rotatable force produced by said steering linkage to horizontally oriented side to side handle bar steering orientation.

9. The motorcycle of claim 1 having multiple pressure sensors in said low box section frame to measure fuel remaining.

10. The motorcycle of claim 9 in which each pressure sensor allows for a computer controlled electronic fuel level gauge.

11. The motorcycle of claim 10 further comprising a tilt sensor for sensing road grade in combination with an accelerometer to detect level of acceleration or deceleration of said motorcycle, and a computer for sampling all said sensors at about two second intervals for providing and displaying a moving average of fuel remaining.

12. The motorcycle of claim 1 in which said hollow members are filled with an open cell foam to minimize sloshing of fuel within said hollow members.

13. The motorcycle of claim 1 having a single fuel pump with multiple fuel intakes in said hollow members, each said intake fitted with a float valve at its distal end to seal said intake when no fuel is present at that location and to allow fuel to flow through said intake to said fuel pump when said float valve is submerged in fuel.

14. The motorcycle of claim 1 in which said front wheel is smaller than said rear wheel.

15. The motorcycle of claim 1 having electric actuators to support said motorcycle upright when not in motion.

16. A motorcycle comprising:
a chassis having a frame;
a fuel tank containing fuel;
an engine mounted to said chassis;
a rear wheel for receiving drive from said engine;
a front wheel mounted for steering of said motorcycle;
a handle bar for steering said motorcycle, and a steering linkage from said handle bar for connection to said front wheel;
a front tube for securing said front wheel, said front tube being partitioned into an upper section rigidly attached to said chassis frame and a lower section joined to said wheel and rotatable with said front wheel when steered; and
a linkage within said front tube transmitting steering motion turning force from said handle bar to said front wheel.

17. The motorcycle of claim 16 having a steering shaft joined at a lower end to rotate said lower section of said front tube and said front wheel, said steering shaft extending through said upper section of said front tube and joined at an upper end of said steering shaft to said steering linkage for transmitting a said steering motion turning force from said handle bar to said lower front tube section and front wheel.

18. The motorcycle of claim 17 wherein said steering shaft is driven by an angular miter gear engagable with a further miter gear engagable with said steering linkage.

19. The motorcycle of claim 17 wherein said steering shaft is driven by a universal joint linkage engagable with said steering linkage.

20. The motorcycle as in claim 17 further comprising a further linkage transforming said rotatable force produced by said steering linkage to horizontally oriented side to side handle bar steering orientation.

21. The motorcycle as in claim 1 further comprising:
an automatic kickstand for said motorcycle having at least one automatic telescopic actuator movable telescopically from a nested storage position upon a frame of said motorcycle to an extended motorcycle support position upon the ground, said at least one actuator supporting said motorcycle upright when said motorcycle is not in motion.

22. The automatic kickstand for a motorcycle as in claim 21 wherein said at least one actuator includes an anti-topple fastener.

23. The automatic kickstand for a motorcycle as in claim 21 wherein said at least one actuator is a pair of actuators.

24. The motorcycle as in claim 16 further comprising:
an automatic kickstand for said motorcycle having at least one automatic telescopic actuator movable telescopically from a nested storage position upon a frame of said motorcycle to an extended motorcycle support position upon the ground, said at least one actuator supporting said motorcycle upright when said motorcycle is not in motion.

25. The automatic kickstand for a motorcycle as in claim 24 wherein said at least one actuator includes an anti-topple fastener.

26. The automatic kickstand for a motorcycle as in claim 24 wherein said at least one actuator is a pair of actuators.

27. A motorcycle comprising:
a chassis having a frame;
a fuel tank containing fuel;
an engine mounted to said chassis;
a rear wheel for receiving drive from said engine;
a front wheel mounted for steering of said motorcycle;
a handle bar for steering said motorcycle, and a steering linkage from said handle bar for connection to said front wheel;
a front tube for securing said front wheel, said front tube being partitioned into an upper section rigidly attached to said chassis frame and a lower section joined to said wheel and rotatable with said front wheel when steered.

28. The motorcycle of claim 27 having a steering shaft joined at a lower end to rotate said lower section of said front tube and said front wheel, said steering shaft extending through said upper section of said front tube and joined at an upper end of said steering shaft to said steering linkage for transmitting a turning force from said handle bar to said lower front tube section and front wheel.

29. The motorcycle as in claim 28 further comprising a linkage transforming said rotatable force produced by said steering linkage to horizontally oriented side to side handle bar steering orientation.

* * * * *